March 29, 1960 C. H. NORDELL 2,930,485
TRASH RACK
Filed Feb. 14, 1955 6 Sheets-Sheet 1
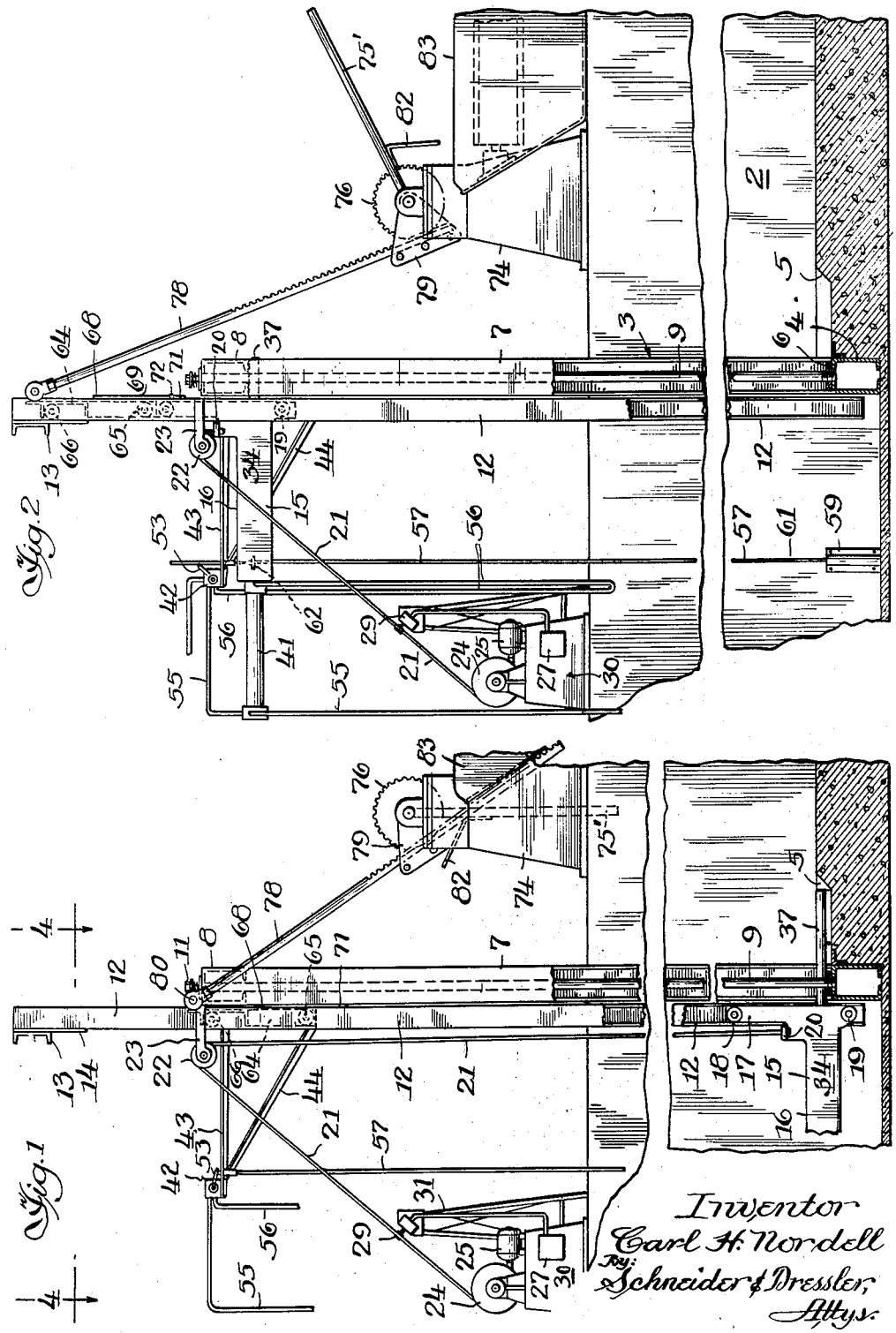
Inventor
Carl H. Nordell
By Schneider & Dressler,
Attys.

March 29, 1960

C. H. NORDELL 2,930,485

TRASH RACK

Filed Feb. 14, 1955

Inventor
Carl H. Nordell
By: Schneider & Dressler, Attys.

March 29, 1960　　　C. H. NORDELL　　　2,930,485
TRASH RACK
Filed Feb. 14, 1955　　　　　　　　　　6 Sheets-Sheet 3
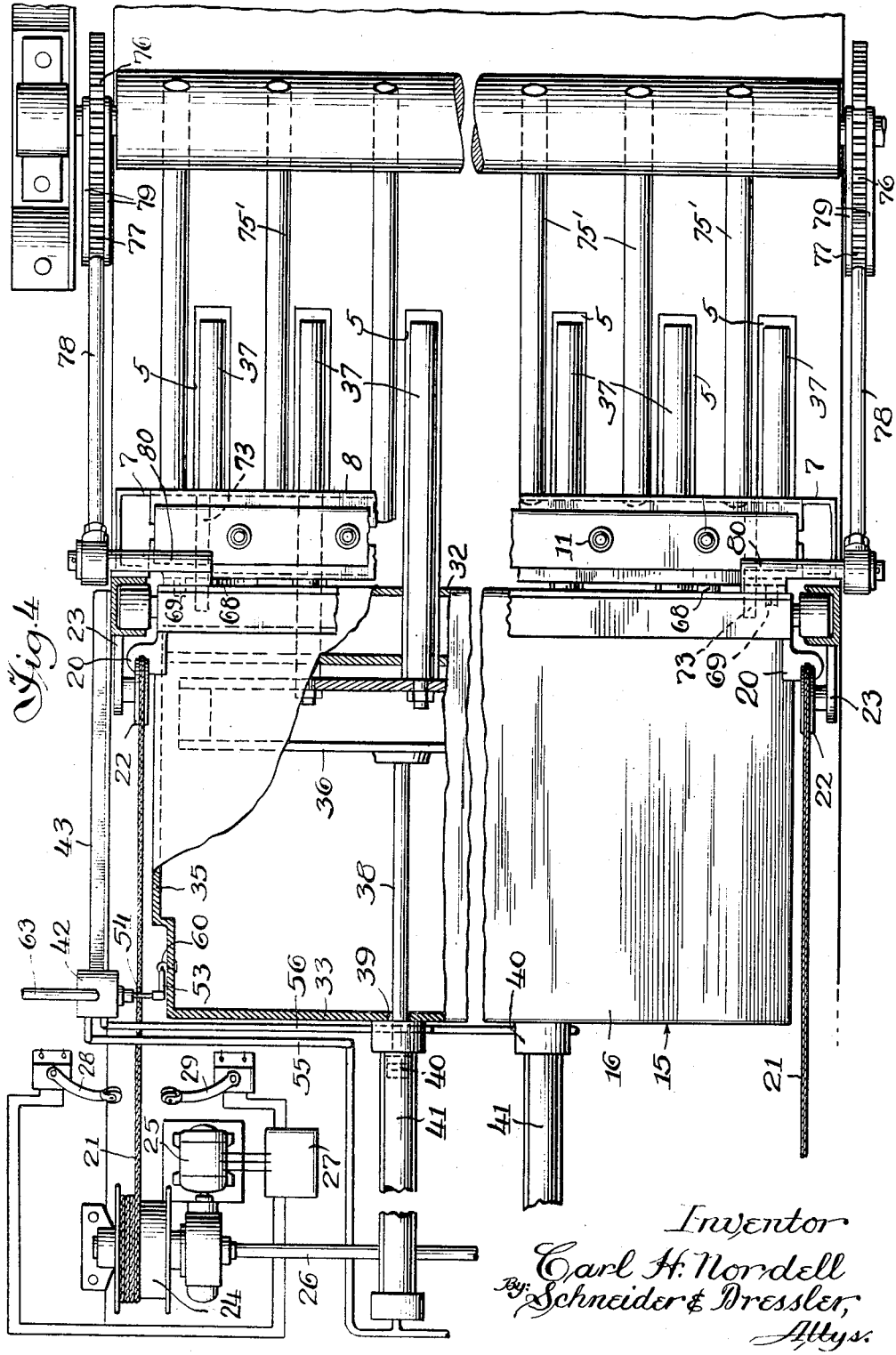

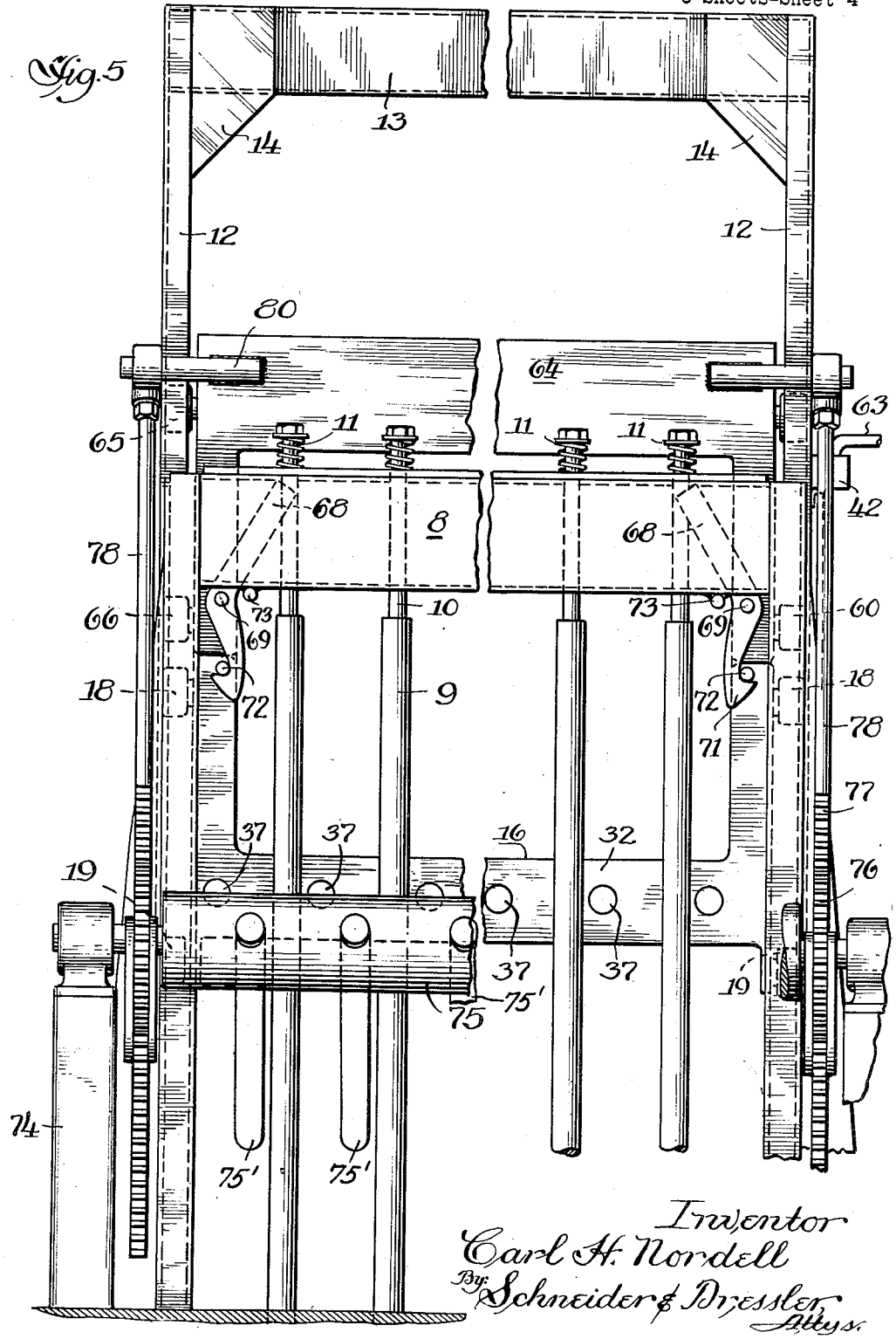

March 29, 1960   C. H. NORDELL   2,930,485
TRASH RACK
Filed Feb. 14, 1955   6 Sheets-Sheet 5
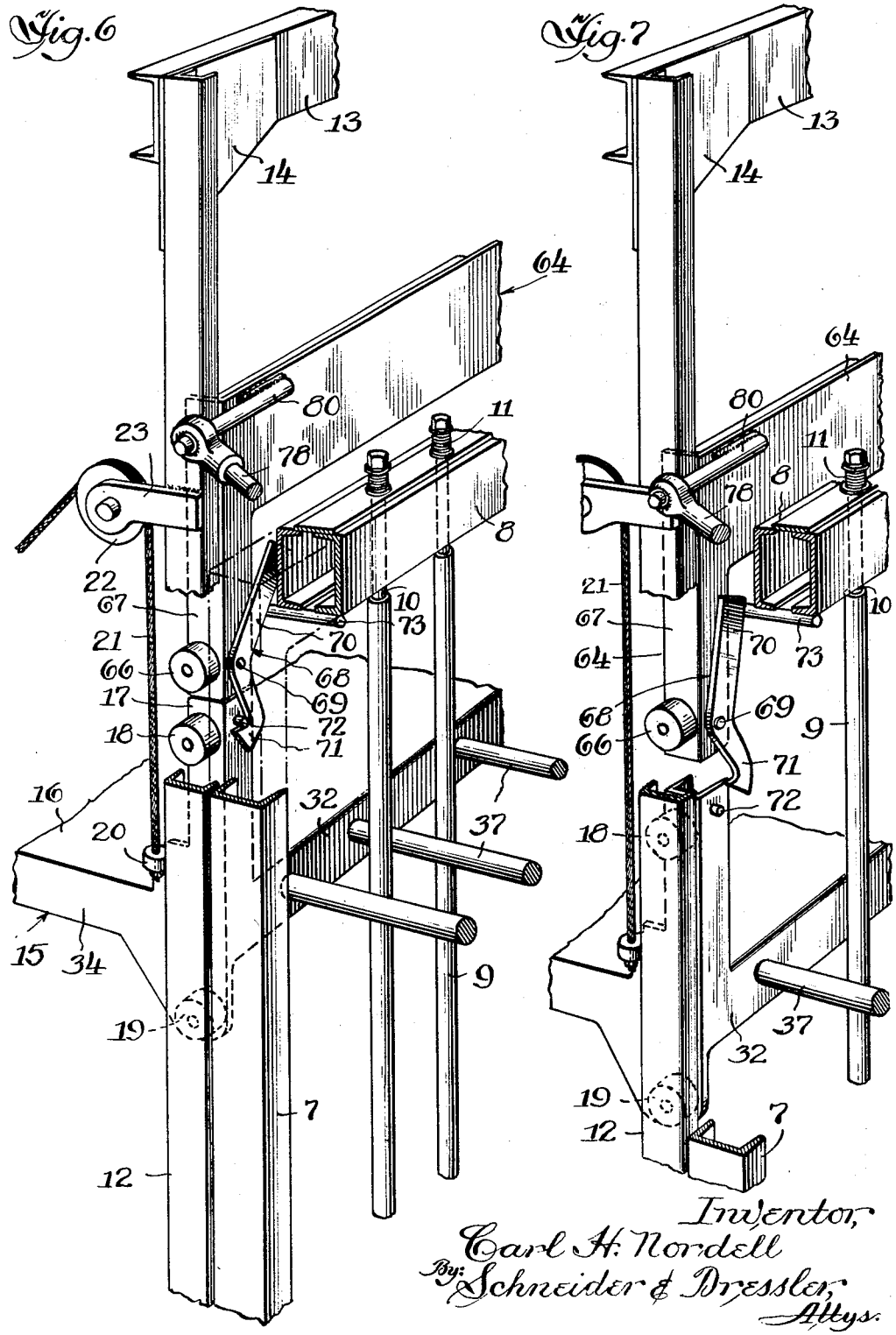

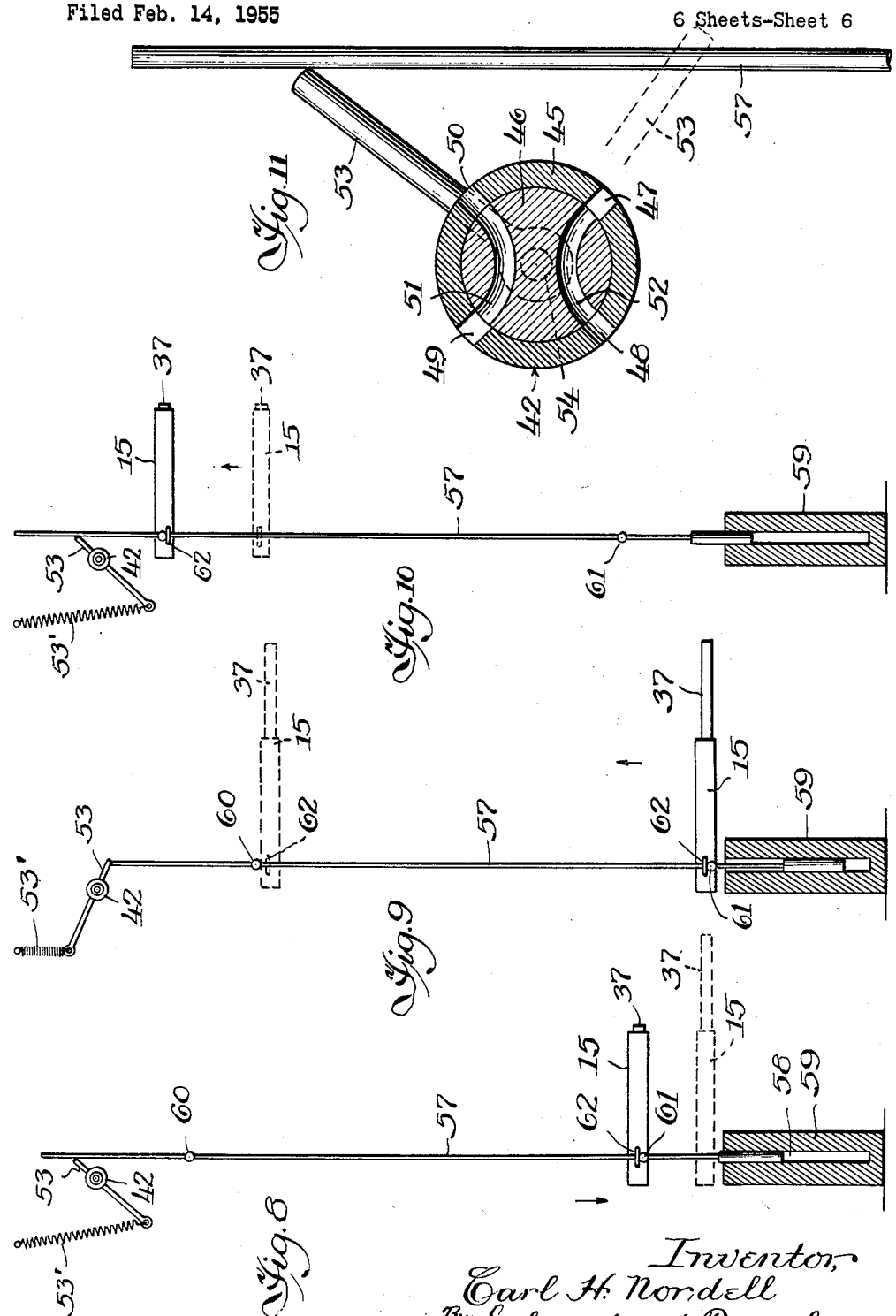

United States Patent Office 2,930,485
Patented Mar. 29, 1960

2,930,485

TRASH RACK

Carl H. Nordell, Crystal Bay, Nev.

Application February 14, 1955, Serial No. 488,045

10 Claims. (Cl. 210—158)

This invention relates to a trash rack, and is particularly concerned with means for removing debris too large to be comminuted from a flowing stream of sewage before the sewage reaches the comminuting device.

In accordance with the present invention, a coarse screen is interposed in a channel through which the raw sewage flows. The screen bars are spaced apart far enough to permit passage of the liquid sewage including solid matter small enough to be comminuted, but will intercept tree branches, logs, sticks, and similar debris too large for efficient comminution. A rake having fingers extending between the screen bars is reciprocated vertically along the face of the screen to lift such debris upwardly along the face of the screen. When the debris has been lifted to a predetermined height a plurality of tines secured to a rotatable cylinder are rotated through the space between adjacent rake fingers to remove the debris from the rake fingers and dump it into a suitable receptacle.

A pair of electrical switches are operated alternately by a cable wound on a drum to control the vertical movement of the rake by reversing the direction of a motor which winds or unwinds the cable.

The fingers of the rake are projected through the screen and retracted by a hydraulic system controlled by a four way valve. The rake moves vertically along a rod provided with a pair of spaced stop members which actuate the four way valve to project the rake teeth when the rake is at its lowermost position and to retract them when the rake is at its uppermost position.

The structure by means of which the above and other advantages of the invention are attained will be described in the following specification, taken in conjunction with the accompanying drawings, showing a preferred illustrative embodiment of the invention, in which:

Figure 1 is a fragmentary side view, partly in elevation and partly in section, of a preferred embodiment of the invention with the rake in its lowermost position;

Fig. 2 is a view, similar to Fig. 1, showing the rake in its uppermost position;

Fig. 4 is a top plan view, with parts broken away, taken generally along the line 4—4 of Fig. 1;

Fig. 5 is a fragmentary front elevational view of the structure shown in Fig. 3;

Fig. 6 is a fragmentary detail perspective view of the rake with the latch holding the upper and lower carriage members together;

Fig. 7 is a view, similar to Fig. 6, with the latch disengaged;

Fig. 8 is a view, partly in elevation and partly in section, of the rod for operating the four way valve to control the reciprocation of the rake fingers, with the rake approaching the bottom stop and showing, in dotted lines, the rake with the rake fingers projecting as the rake is ready to start its upward movement;

Fig. 9 is a view, similar to Fig. 8, with the rake at the start of its upward movement in solid lines, and in dotted lines, at the uppermost limit of its travel, ready to operate the four way valve to retract the rake fingers;

Fig. 10 is a view similar to Fig. 8, with the rake in its uppermost position; and Fig. 11 is a fragmentary elevational view of the upper end of the rod, in the solid line position of Fig. 10, with the four way valve shown in cross section.

Figure 3:
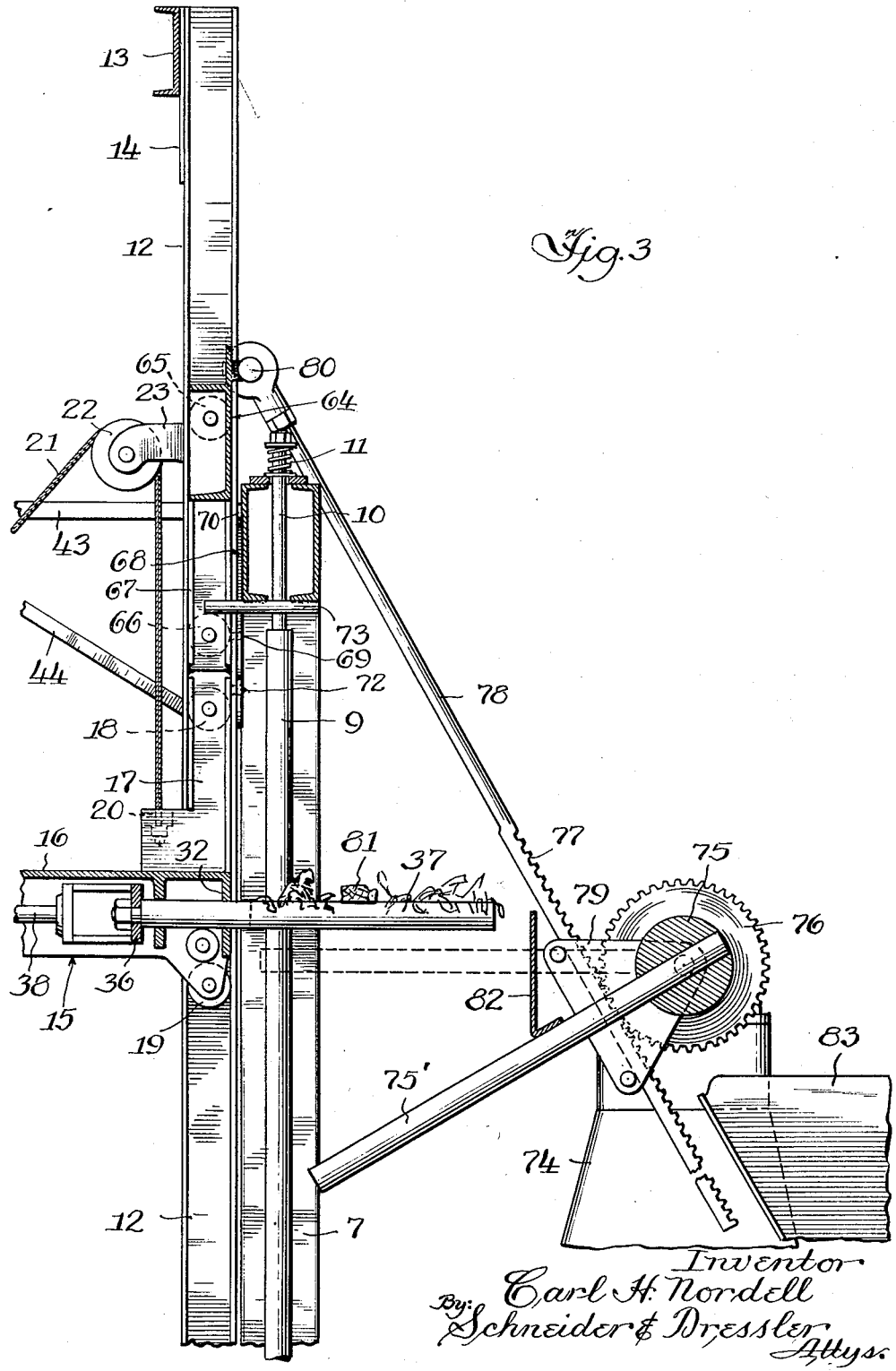
Fig. 3 is a fragmentary side elevational view showing the rake as it is moving upwardly.

In the drawings, the reference numeral 2 indicates a channel through which raw sewage flows. A vertically disposed screen 3 extending transversely across channel 2 includes a transverse base 4 rigidly secured to the bottom of the channel. As shown in Figs. 1 and 2 the bottom of channel 2 is recessed adjacent the upstream side of the screen, as indicated at 5, to provide space for the reception of rake teeth, hereinafter described, in their lowermost position. The top wall 6 of base 4 is flush with the bottom of recess 5. Screen 3 includes a pair of vertical channel members 7 adjacent opposite walls of channel 2, and an upper transverse member 8. A plurality of transversely spaced screen bars, preferably in the form of tubular pipes 9, are threaded into base 4 and extend upwardly to upper transverse member 8. The upper end of each pipe is secured by a rod 10 projecting through member 8 and into the upper end of the pipe. It should be understood that any suitable screen may be used, the only requirement being that it be strong enough to stop heavy objects, such as logs, and be spaced apart far enough to permit passage of solids of a size suitable for comminution. The upper end of each rod 10 is encircled by a compression spring 11 to permit a slight resilience when pipe 9 receives a heavy impact, to prevent distortion of the screen.

A channel member 12 is rigidly secured to each channel member 7 and extends in parallel relationship to channel member 7 to a point considerably above upper transverse member 8. The upper ends of channel members 12 are secured to a transverse channel member 13. A brace plate 14 (Figs. 6 and 7), to which channel members 12 and 13 are welded, provides additional rigidity.

A lower carriage member 15 comprising a horizontal platform 16 and a pair of upright corner members 17 at its front edge is provided with a pair of rollers 18 and 19 rotatably mounted in vertically spaced relationship on each of the corner members. Rollers 18 and 19 are mounted for rotation in channel members 12 to permit vertical reciprocation of the lower carriage member. An apertured bracket 20 projecting from each of the corner members 17 has one end of a cable 21 secured thereto. Each cable 21 passes over a pulley 22 rotatably mounted on a bracket 23 welded to the adjacent channel member 12.

The other end of cable 21 is wound on a drum 24 (Fig. 4) rotated by a motor 25. A shaft 26 connects drum 24 to a similar drum at the opposite side to provide synchronized movement of cables 21 at both ends of the carriage. Motor 25 is provided with a reversible starter 27 controlled by a pair of laterally spaced switches 28 and 29. While carriage 15 is being pulled upwardly by cable 21 the cable is being wound on drum 24, and, since the convolutions of the cable lie side by side on the surface of the drum, the cable gradually moves laterally towards switch 29. When the carriage reaches its uppermost position, cable 21 actuates switch 29 to reverse the motor and start the carriage on its downward movement. When carriage 15 reaches its lowermost position cable 21 actuates switch 28 and again reverses the motor to start the carriage on its upward movement.

As shown in Figs. 1 and 2, drum 24, motor 25, and starter 27 are mounted on a base member 30 mounted on or adjacent one of the side walls of channel 2. Switches 28 and 29 are supported on standards 31 to position them adjacent the stretch of cable 21 extending between pulley 22 and drum 24.

Platform 16 is provided with depending front and back walls 32 and 33, and depending side walls 34 and 35 respectively. A rake 36 positioned under platform 16 is provided with a plurality of transversely spaced fingers 37 each extending through apertures provided therefor in front wall 32 and adapted to project through the spaces between adjacent pipes 9. A pair of piston rods 38 rigidly secured to rake 36 extend rearwardly through apertures 39, in back wall 33. Each rod 38 is secured to a piston 40 slidably mounted in a cylinder 41.

The pistons 40 are reciprocated by a hydrauic system controlled by a four wave valve 42 that is mounted on a bar 43 secured to one channel member 12 and extending rearwardly therefrom. A brace 44 secured at one end to channel member 12 is secured at its end to bar 43 to provide additional stability. As shown in Fig. 11, valve 42 comprises an outer member 45 and an inner member 46 rotatably mounted within the outer member. Outer member 45 is provided with four ports 47, 48, 49 and 50 to each of which one of the hydraulic lines is connected. Inner member 46 is provided with two transverse passageways 51 and 52, the ends of which are adapted to register with ports 47, 48, 49 and 50. An arm 53 rigidly mounted on a shaft 54 projecting from inner member 46 is rotatable to rotate the inner valve member relative to outer member 45, and thereby switch the connections between the various hydraulic lines to reverse the reciprocatory movement of pistons 40. One hydraulic line 55 (Fig. 4) is connected to the rear side of both cylinders 41, and another line 56 is connected to the front side of both cylinders to insure synchronized reciprocatory movement of both pistons.

Arm 53 is spring pressed, as indicated at 53', and is urged towards the down position shown in Fig. 9 in which the valve is set to project rake fingers 37 forwardly of lower carriage 15. A rod 57, seated in a recess 58 in a supporting base 59, extends upwardly into engagement with arm 53. Rod 57 is provided with a pair of vertically spaced stop members 60 and 61. Lower carriage member 15 has an eye bolt 62 projecting therefrom, and the portion of rod 57 between stop members 60 and 61 passes through the aperture of the eye bolt. The stop members are engaged by the eye bolt near the end of the travel of the lower carriage member. Where the carriage 15 moves downwardly it engages stop member 61 near the bottom of its movement and moves rod 57 downwardly. This movement of the rod brings its upper end below arm 53 and permits arm 53 to rotate downwardly because of the spring pressure.

The downward movement of arm 53 moves valve 42 into the position in which hydraulic line 63 extending from the pump (not shown) of the hydraulic system is connected to line 55 which communicates with the rear sides of cylinders 40 to project rake fingers 37 forwardly of the lower carriage. The rake fingers project in front of pipes 9 and carry the debris intercepted by the screen upwardly as the rake is moved upwardly by carriage 15.

As carriage 15 approaches the upper limit of its travel eye bolt 62 engages stop member 60 to raise rod 57, thereby rotating arm 53 upwardly to reverse valve 42, by connecting hydraulic line 63 to the hydraulic line 56 communicating with the front side of cylinders 41, and retract rake fingers 34. Rod 57 prevents arm 53 from rotating downwardly until eye bolt 62 again engages stop member 61 to move the rod out of the way of arm 53. Accordingly, rake fingers 37 are projected forwardly of the screen while the rake is moving upwardly to remove the intercepted debris from the screen, and are retracted when the rake is moving downwardly.

An upper carriage member 64 is provided with rollers 65 and 66 on each edge, similar to rollers 18 and 19, which are rotatably mounted in channel members 12. Carriage member 64 has a pair of upright corner members 67 aligned vertically with corner members 17 of the lower carriage member. As lower carriage member is moved upwardly the upper ends of its corner members 17 engage the lower ends of corner members 67 to move upper carriage member 64 upwardly.

A latch 68 is pivoted on the front of each upright corner member 67, as indicated at 69. The upper arm 70 of latch 68 is longer than arm 71 and normally urges it towards the left as seen in Fig. 6. Arm 71 is provided with a hooked end adapted to engage a pin 72 projecting forwardly from the front of corner member 17. When the two carriage members are latched together in this manner downward movement of the lower carriage member pulls the upper carriage member downwardly with it. A pin 73 secured to the bottom of upper transverse member 8 of the screen projects rearwardly to engage arm 70, thereby disengaging hooked end 71 from pin 72 when the carriage members are moved downwardly below upper transverse member 8. The downward movement of the upper carriage member is stopped adjacent the upper end of the screen and lower carriage member 15 continues its downward movement alone.

A pair of support bases 74 mounted on the top of each side wall of channel 2 rotatably support opposite ends of a cylinder 75 (Fig. 3). Cylinder 75 is spaced forwardly of the screen and is provided with a plurality of laterally projecting tines 75' adapted to rotate with the cylinder. Tines 75' are long enough to reach past pipes 9 of the screen, and are spaced to fit between the pipes and rake fingers 37 when the rake fingers are projected forwardly. A gear 76 mounted adjacent each end of cylinder 75 is meshed with rack teeth 77 on one edge of a bar 78. The bar 78 extends through a guide member 79 secured to cylinder 75 which holds teeth 77 in mesh with the teeth of gear 76.

The upper end of each bar 78 is pivotally mounted on the end of a stud 80 which is secured to upper carriage member 64 and projects laterally thereof. The intermeshing of gears 76 with rack teeth 77 is so arranged that when upper carriage member 64 is in its lowermost position, tines 75' are spaced below rake fingers 37. The tines remain in such position as lower carriage member 15 is moved upwardly until the lower carriage engages the upper one to move it upwardly. Upper carriage member 64 carries the upper end of bar 78 with it, thereby causing rack teeth 77 to rotate cylinder 75 and tines 75'. The rotation of tines 75' moves them upwardly faster than the upward movement of rake 36, with the result that tines 75' pass upwardly between rake fingers 37 and remove debris 81 that is being carried upwardly by the rake fingers. A guard 82 is mounted on tines 75' to prevent the debris from falling on cylinder 75 as the rotation of the tines lifts the debris across the top of the cylinder to dump it in a suitable disposal area upstream of cylinder 75. Tines 75' reach their dumping position when the upper carriage member is in its uppermost position, as shown in Fig. 2. Suitable means, such as a receptacle 83 or a conveyor belt, is positioned adjacent base 74 on the upstream side to receive the solids dumped from the tines.

Although I have described a preferred embodiment of my invention in considerable detail, it will be understood that the description thereof is intended to be illustrative, rather than restrictive, as many details may be modified or changed without departing from the spirit or scope of the invention. Accordingly, I do not desire to be restricted to the exact details of construction described.

I claim:

1. In combination, a screen adapted to be interposed vertically in a flowing stream of sewage to intercept solids therein, a rake positioned adjacent said screen, means for reciprocating said rake vertically relative to said screen to push intercepted solids upwardly along the surface of said screen, a rotatable cylinder mounted upstream of said screen, a plurality of tines rigidly secured to and projecting laterally from said cylinder, and means actuated by the vertical movement of said rake to rotate said cylinder in both directions, the rotation of said cylinder in one direction being effective to pass said tines upwardly through said rake to remove intercepted solids from said rake and to transfer them to a disposal area spaced upstream of said cylinder, and the rotation of said cylinder in the opposite direction being effective to restore said tines to their initial position.

2. In combnation, a screen adapted to be interposed in a flowing stream of sewage to intercept solids therein, said screen comprising a series of vertically extending transversely spaced screen bars, a rake provided with a plurality of fingers adapted to extend through spaces between said screen bars, means to reciprocate said rake longitudinally of said screen bars, said rake fingers pushing intercepted solids upwardly along said screen during the upward movement of said rake, a support base spaced upstream of said screen, a cylinder rotatably mounted on said support base, a gear rigidly secured to said cylinder, a bar provided with rack teeth meshed with said gear, means operatively connected to said rake for reciprocating said bar to rotate said cylinder, and a plurality of tines rigidly secured to said cylinder, said tines being passable through spaces between said rake fingers as said cylinder is rotated during the upward movement of said rake to remove said intercepted solids from said rake fingers.

3. In combination, a screen adapted to be interposed in a flowing stream of sewage to intercept solids therein, said screen comprising a series of vertically extending transversely spaced screen bars, a pair of channel members positioned adjacent said screen, a carriage member reciprocably mounted in said channel members, means for reciprocating said carriage member longitudinally of said screen bars, a rake mounted in said carriage member, said rake having a plurality of fingers, hydraulic means including a valve controlled by the vertical movement of said carriage for projecting said fingers axially through spaces between said screen bars as said carriage is being moved upwardly to push solids intercepted by said screen upwardly along the surface of said screen, and rotatable means passable upwardly through spaces between said rake fingers as said rake is being moved upwardly, to remove intercepted solids therefrom and to transfer said solids to a disposal area spaced from said screen.

4. In combination, a screen adapted to be interposed in a flowing stream of sewage to intercept solids therein, said screen comprising a series of vertically extending transversely spaced screen bars, a pair of channel members positioned adjacent said screen, a carriage member reciprocably mounted in said channel members, means for reciprocating said carriage member longitudinally of said screen bars, a rake mounted in said carriage member, said rake having a plurality of fingers, hydraulic means including a valve controlled by the vertical movement of said carriage for projecting said fingers axially through spaces between said screen bars as said carri ge is being moved upwardly, whereby said fingers push solids intercepted by said screen upwardly along the surface of said screen, a support base spaced upstream of said screen, a cylinder rotatably mounted on said support base, a plurality of tines projecting laterally from said cylinder, said tines having a length approximately equal to the distance between said cylinder and said screen, and means for rotating said cylinder as said rake is being moved upwardly to pass said tines through spaces between said rake fingers, said tines removing intercepted solids from said rake fingers.

5. In combination, a screen adapted to be interposed in a flowing stream of sewage to intercept solids therein, said screen comprising a series of vertically extending transversely spaced screen bars, a pair of channel members positioned adjacent said screen, a carriage member reciprocably mounted in said channel members, means for reciprocating said carriage member longitudinally of said screen bars, a rake mounted in said carriage member, said rake having a plurality of fingers, means for retracting said fingers rearwardly of said screen bars as said carriage is being moved downwardly and for projecting said fingers axially through spaces between said screen bars as said carriage is being moved upwardly, whereby said fingers push solids intercepted by said screen upwardly along the surface of said screen, a support base spaced upstream of said screen, a cylinder rotatably mounted on said support base, a gear rigidly secured to said cylinder, a bar provided with rack teeth meshed with said gear, means for reciprocating said bar to rotate said cylinder, and a plurality of tines rigidly secured to said cylinder, said tines passing through spaces between said rake fingers to remove said intercepted solids from said rake fingers as said cylinder is rotated during the upward movement of said rake.

6. In combination, a screen adapted to be interposed in a flowing stream of sewage to intercept solids therein, said screen comprising a series of vertically extending transversely spaced screen bars, a pair of channel members positioned adjacent said screen, a lower carriage member and an upper carriage member reciprocably mounted in said channel members, means for reciprocating said carriage members longitudinally of said screen bars, a rake mounted in said lower carriage member, said rake having a plurality of fingers, means for projecting said fingers through spaces between said screen bars as said lower carriage is being moved upwardly, whereby said fingers push solids intercepted by said screen upwardly along the surface of said screen, a pair of support bases spaced upstream of said screen, a cylinder rotatably mounted on said support bases, a gear rigidly secured to said cylinder, a bar pivotally secured at one end to said upper carriage member, said bar having rack teeth meshed with said gear to rotate said cylinder as said upper carriage is being moved vertically, and a plurality of tines rigidly secured to said cylinder, said tines passing through spaces between said rake fingers to remove said intercepted solids from said rake fingers as said cylinder is rotated during the upward movement of said upper carriage.

7. In combination, a screen adapted to be interposed in a flowing stream of sewage to intercept solids therein, said screen comprising a series of vertically extending transversely spaced screen bars, a pair of channel members positioned adjacent said screen, a lower carriage member reciprocably mounted in said channel members, means for reciprocating said lower carriage member longitudinally of said screen bars, an upper carriage member reciprocably mounted in said channel members, the lowermost position of said upper carriage member being adjacent the upper end of said screen, said lower carriage member engaging said upper carriage member to push it upwardly from its lowermost position, interengageable latching means on said carriage members to insure downward movement of said upper carriage member to its lowermost position with downward movement of said lower carriage member, means automatically disengaging said latching means at the lowermost position of said upper carriage member as said carriage members are moved downwardly, to permit separate downward movement of said lower carriage member below the lowermost position of said upper carriage member, a rake mounted in said lower carriage member, said rake having a plurality of fingers, means for projecting said fingers through spaces between said screen bars as said lower carriage is being moved upwardly, whereby said fingers push solids intercepted by said screen upwardly along the surface of said screen, a pair of support bases spaced upstream of said screen, a cylinder rotatably mounted on said support bases, a gear rigidly secured to said cylinder, a bar pivotally secured at one end to said upper carriage member, said bar having rack teeth meshed with said gear to rotate said cylinder as said upper carriage is being moved vertically, and means projecting from said cylinder to remove intercepted solids from said fingers as said fingers are being moved upwardly.

8. In combination, a screen adapted to be interposed in a flowing stream of sewage to intercept solids therein, said screen comprising a series of vertically extending transversely spaced screen bars, a pair of channel members positioned adjacent said screen, a lower carriage member reciprocably mounted in said channel members, means for reciprocating said lower carriage member longitudinally of said screen bars, an upper carriage member reciprocably mounted in said channel members, the lowermost position of said upper carriage member being adjacent the upper end of said screen, said lower carriage member engaging said upper carriage member to push it upwardly from its lowermost position, a latch pivotally secured to said upper carriage member, a pin projecting from said lower carriage member, said pin being engageable automatically with said latch as said lower carriage member is moved upwardly into engagement with said upper carriage member to insure downward movement of said upper carriage member to its lowermost position with downward movement of said lower carriage member, a pin projecting rearwardly from the upper end of said screen, said pin engaging said latch to automatically disengage it from said first mentioned pin at the lowermost position of said upper carriage member as said carriage members are moved downwardly, to permit separate downward movement of said lower carriage member below the lowermost position of said upper carriage member, a rake mounted in said lower carriage member, said rake having a plurality of fingers, means for projecting said fingers through spaces between said screen bars as said lower carriage is being moved upwardly, whereby said fingers push solids intercepted by said screen upwardly along the surface of said screen, a pair of support bases spaced upstream of said screen, a cylinder rotatably mounted on said support bases, a gear rigidly secured to said cylinder, a bar pivotally secured at one end to said upper carriage member, said bar having rack teeth meshed with said gear to rotate said cylinder as said upper carriage is being moved vertically, and a plurality of tines rigidly secured to said cylinder, said tines passing through spaces between said rake fingers to remove said intercepted solids from said rake fingers as said fingers are being moved upwardly.

9. In combination, a screen adapted to be interposed in a flowing stream of sewage to intercept solids therein, a carriage mounted for vertical movement adjacent said screen, a rake mounted in said carriage, said rake having a plurality of fingers adapted to project through said screen, means for moving said carriage upwardly with said fingers projecting through said screen to push intercepted solids upwardly along the surface of said screen, means mounted above said carriage in vertical alignment therewith, said last mentioned means being movable vertically by said carriage, a cylinder rotatably mounted upstream of said screen in spaced relationship thereto, a gear connected to said cylinder, a bar connected to said last mentioned means and having rack teeth on one edge engaging said gear for rotating said cylinder upon vertical movement of said last mentioned means, and a plurality of tines rigidly secured to said cylinder and projecting laterally therefrom, said tines being movable between said fingers to engage solids being pushed upwardly along the surface of said screen to remove said solids from said fingers and to transfer them to a disposal area spaced from said screen as said rake is being moved upwardly.

10. In combination, a screen adapted to be interposed in a flowing stream of sewage to intercept solids therein, said screen comprising a plurality of vertically extending transversely spaced screen bars, a rake positioned adjacent said screen, said rake having a plurality of fingers extending at right angles to the plane of said screen, means for reciprocating said rake vertically relative to said screen, hydraulic means including a valve controlled by the vertical movement of said rake relative to said screen to move said fingers axially to project them through the spaces between said screen bars at the lowermost position of said rake, whereby said fingers push intercepted solids upwardly along the surface of said screen as said rake is moved upwardly, a cylinder rotatably mounted upstream of said screen, a plurality of tines rigidly secured to and projecting laterally from said cylinder, a gear mounted on said cylinder, and means synchronized with the upward movement of said rake, said means engaging said gear to rotate said cylinder to move said tines into engagement with intercepted solids being pushed upwardly along said screen by said rake fingers, said tines being operable to remove said intercepted solids from said rake fingers to transfer them to a disposal area spaced from said cylinder.

References Cited in the file of this patent

UNITED STATES PATENTS

| | | |
|---|---|---|
| 1,227,899 | Fahle | May 29, 1917 |
| 2,033,653 | Schlapak et al. | Mar. 10, 1936 |
| 2,335,573 | Scott | Nov. 30, 1943 |
| 2,671,563 | Benner | Mar. 9, 1954 |
| 2,684,157 | Tolman | July 20, 1954 |

FOREIGN PATENTS

| | | |
|---|---|---|
| 100,889 | Australia | Apr. 27, 1937 |
| 244,946 | Great Britain | Dec. 31, 1925 |
| 649,812 | Germany | Sept. 4, 1937 |